United States Patent [19]

Tsutsui et al.

[11] Patent Number: 5,448,659
[45] Date of Patent: Sep. 5, 1995

[54] WAVEGUIDE-TYPE IMAGE TRANSMISSION DEVICE AND FINGERPRINT IDENTIFICATION DEVICE

[75] Inventors: Hiroshi Tsutsui, Yawata; Yoshinao Taketomi, Moriguchi, both of Japan

[73] Assignee: Matsushita Electric Industrial Co., Ltd., Osaka, Japan

[21] Appl. No.: 189,836

[22] Filed: Feb. 1, 1994

[30] Foreign Application Priority Data

Feb. 1, 1993 [JP] Japan .................. 5-014537

[51] Int. Cl.6 .............................................. G02B 6/12
[52] U.S. Cl. ........................................ 385/14; 356/71; 359/2; 359/34; 382/124; 385/37; 385/129
[58] Field of Search ............... 385/14, 37, 129–132; 359/2, 15, 34; 356/71; 382/2, 4, 5

[56] References Cited

U.S. PATENT DOCUMENTS

| | | | |
|---|---|---|---|
| 3,771,129 | 11/1973 | McMahon | 382/4 |
| 4,246,568 | 1/1981 | Peterson | 382/4 |
| 4,340,300 | 7/1982 | Ruell | 356/71 |
| 4,400,616 | 8/1983 | Chevillat et al. | 359/34 X |
| 4,796,273 | 1/1989 | Yamaguchi | 372/96 |
| 4,866,694 | 9/1989 | Korth | 385/129 X |
| 4,937,808 | 6/1990 | Shimada et al. | 385/130 X |
| 5,144,638 | 9/1992 | Davin | 372/107 |
| 5,212,712 | 5/1993 | Makuta | 372/96 |
| 5,323,477 | 6/1994 | Lebby et al. | 385/129 |

FOREIGN PATENT DOCUMENTS

| | | |
|---|---|---|
| 0047326 | 3/1982 | European Pat. Off. . |
| 0451565 | 10/1991 | European Pat. Off. . |
| 0514573 | 11/1992 | European Pat. Off. . |
| WO82/03286 | 9/1982 | WIPO . |
| WO92/11608 | 7/1992 | WIPO . |

*Primary Examiner*—John D. Lee
*Attorney, Agent, or Firm*—Fish & Richardson

[57] ABSTRACT

A card-shaped waveguide-type image transmission device has an image transmission base member piled up on a light illumination base member, and an optical system such as grating patterns and diffraction lens pattern for diffracting and focusing light beams are formed on the surfaces of the image transmission base member and the light illumination base member. The card-shaped waveguide-type image transmission device is integrated with an ID card, an IC card, an optical card or a ROM card as a fingerprint identification device.

17 Claims, 6 Drawing Sheets

WAVEGUIDE-TYPE IMAGE TRANSMISSION DEVICE AND FINGERPRINT IDENTIFICATION DEVICE

FIELD OF THE INVENTION

This invention relates to a waveguide-type image transmission device which is effective for personal identification by identifying a fingerprint, and further relates to a fingerprint identification device.

BACKGROUND OF THE INVENTION

A conventional optical method and system for identifying a personal fingerprint is disclosed in Publication Gazettes of Unexamined Japanese Patent Application Hei 1-119881 and 1-119882. These publications disclose a method where a finger is put on a picture image inputting surface of a fingerprint identification device. A light beam is radiated from a light source for illuminating the finger, and the reflected light beam from the finger is inputted to the fingerprint identification device. The light beam is deflected by a mirror, focused by a pair of cylindrical lenses and inputted to a line charge coupled device (CCD) sensor through a pair of spatial filters, located in the fingerprint identification device.

The conventional method or system for identifying a fingerprint, however, requires independent optical elements such as a mirror, cylindrical lenses, spatial filters and the like for radiating the light beam and focusing the reflected light beam. Thus, it is difficult to make the conventional fingerprint identification system small.

SUMMARY OF THE INVENTION

An object of the invention is to solve the above-mentioned problem of the conventional fingerprint identification method or system, and to provide an improved waveguide-type image transmission device without using independent optical elements such as an optical lens for radiating the illumination light beam and focusing the reflected light beam. Furthermore, the purpose of the invention is to provide a fingerprint identification device using the waveguide-type image transmission device.

For attaining the above and other objects and advantages, the waveguide-type image transmission device of this invention comprises:

a light illumination means having: a light illumination base member made of a light transparent material and transmitting a light beam by multiple reflection on the boundary faces thereof; a first grating pattern formed on a part of a surface of the light illumination base member and diffracting an inputted light beam in a predetermined direction; a second grating pattern formed on another part of the surface of the light illumination base member and diffracting and outputting the light beam transmitted in the light illumination base member in another predetermined direction for illuminating an object to be identified; and an image transmission means having: an image transmission base member made of a light transparent material and transmitting a light beam by multiple reflection on the boundary faces thereof; a third grating pattern formed on a part of a surface of the image transmission base member and diffracting an input light beam which is reflected by the object in a predetermined direction; a diffraction lens pattern formed on another part of the surface of the image transmission base member for focusing the light beam which is transmitted in the image transmission base member; and a fourth grating pattern formed on still another part of the surface of the image transmission base member and diffracting and outputting the light beam which is transmitted in the image transmission base member and focused by the diffraction lens pattern in still another predetermined direction.

In the waveguide-type image transmission device configured above, the first and second grating patterns are respectively provided at a predetermined interval and on different surfaces of the light illumination base member which are facing each other, and an exit area of the light is expanded corresponding to the product of a divergent angle of the light source and the predetermined interval.

Alternatively, in the waveguide-type image transmission device configured above, the first and the second grating patterns are provided on the same surface of the light illumination base member at a predetermined interval.

In the waveguide-type image transmission device configured above, the third and fourth grating patterns are respectively provided on different surfaces of the image transmission base member which are facing each other, and a part of the light beam reflected by the object and having a predetermined incident angle is inputted to the image transmission base member from the third grating pattern.

Alternatively, in the waveguide-type image transmission device configured above, the third and fourth grating patterns and the diffraction lens pattern are provided on the same surface of the image transmission base member at predetermined intervals.

In the waveguide-type image transmission device configured above, the object may be a personal fingerprint, a palmprint or other object for identification.

In the waveguide-type image transmission device configured above, the image transmission base member may be piled up on the light illumination base element, thereby forming a card shape.

The waveguide-type image transmission device configured above may be integrated with an ID card, an IC card, an optical card or a ROM card.

The waveguide-type image transmission device may further comprise a memory for storing registered image data of personal fingerprints, and the stored personal fingerprint data is read out from the memory at the same time as inputting the fingerprint image.

A fingerprint identification device in accordance with the invention comprises: a card-shaped waveguide-type image transmission device having a light illumination means, an image transmission means, a light emitting element, a light detecting element and a control circuit for controlling the light emitting element and the light detecting element.

In the fingerprint identification device, the card-shaped waveguide-type image transmission device comprises:

a light illumination means having: a light illumination base member made of a light transparent material and transmitting a light beam by multiple reflection on the boundary faces thereof; a first grating pattern formed on a part of a surface of the light illumination base member and diffracting an inputted light beam in a predetermined direction; a second grating pattern formed on another part of the surface of the light illumination base member and diffracting and outputting the light beam transmitted in the light illumination base member in another predetermined direction for illuminating an object to be identified; and an image transmission means having: an image transmission base member made of a transparent material and transmitting a light beam by multiple reflection on the boundary faces thereof; a third grating pattern formed on a part of a surface of the image transmission base member and diffracting an input light beam which is reflected by the object in a predetermined direction; a diffraction lens pattern formed on another part of the surface of the image transmission base member for focusing the light beam which is transmitted in the image transmission base member; and a fourth grating pattern formed on still another part of the surface of the image transmission base member and diffracting and outputting the light beam which is transmitted in the image transmission base member and focused by the diffraction lens pattern in still another predetermined direction.

In the fingerprint identification device, the first and second grating patterns may be respectively provided at a predetermined interval and on different surfaces of the light illumination base member which are facing each other, and an exit area of the light is expanded corresponding to the product of a divergent angle of the light source and the predetermined interval.

Alternatively, the first and the second grating patterns are provided on the same surface of the light illumination base member at a predetermined interval.

In the fingerprint identification device, the third and fourth grating patterns may be respectively provided on different surfaces of the image transmission base member which are facing each other, and a part of the light beam reflected by the object and having a predetermined incident angle is inputted to the image transmission base member from the third grating pattern.

Alternatively, in the fingerprint identification device configured above, the third and fourth grating patterns and the diffraction lens pattern are provided on the same surface of the image transmission base member at predetermined intervals.

In the fingerprint identification device of the invention, the waveguide-type image transmission device is integrated with an ID card, an IC card, an optical card or a ROM card.

The waveguide-type image transmission device of the fingerprint identification device may further comprise a memory for storing registered image data of personal fingerprints and the stored personal fingerprint data is read out from the memory at the same time as inputting the fingerprint image.

As mentioned above, the waveguide-type image transmission device in accordance with the invention needs no independent optical element such as an optical lens or the like, so that the waveguide-type image transmission device or the fingerprint identification device which is an application of the waveguide-type image transmission device can be downsized. Furthermore, the optical system of the invention has a very simple configuration, so that the light emitting element and light detecting element can be integrated in the card-shaped devices. Thus, the waveguide-type image transmission device or the fingerprint identification device can be mass produced and inexpensive. Furthermore, even when many persons use the same fingerprint identification system, there is no problem due to dirt or damage of the optical system. As a result, the fingerprint identification system can be maintained in substantially the same manner as the conventional card identification system.

In addition, when the waveguide-type image transmission device is integrated with an ID card, the ID data is used for reading out a specific fingerprint image data among many personal fingerprint image data stored in the memory. Thus, a higher level security system can be attained. Moreover, when the waveguide-type image transmission device is integrated with the ID card, a large amount of personal fingerprint image data can be stored in an IC memory. In this case, personal identification can be executed by using the ID card only without storing the personal finger imaged data in each terminal. Furthermore, when the waveguide-type image transmission device is used together with an optical card or ROM card, the fingerprint identification can be executed by using the card only, since an optical card or ROM card has a large memory capacity like the IC card, and they can store many personal fingerprint image data.

DETAILED DESCRIPTION OF THE INVENTION

Figure 1:
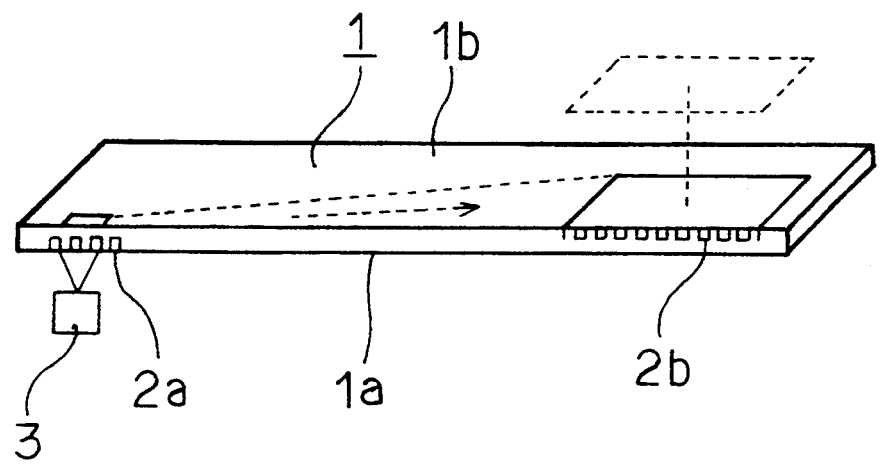
FIG. 1 is a perspective view showing a preferred embodiment of a light illumination base member in accordance with the invention.
Figure 7:
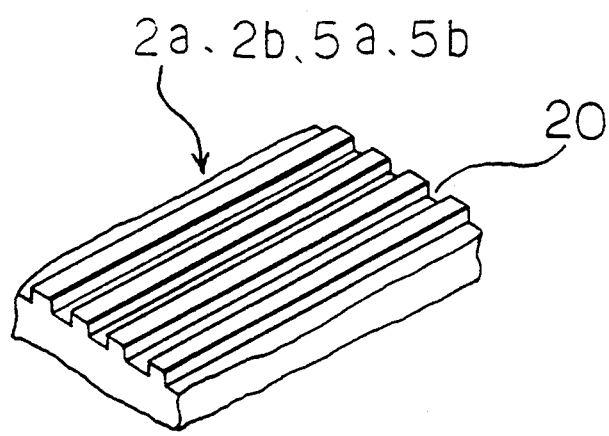
FIG. 7 is an enlarged perspective view showing a preferred embodiment of a grating pattern in accordance with the invention.

A preferred embodiment of a light illumination base member in accordance with the invention is described referring to FIGS. 1 and 7. FIG. 1 is a perspective view showing a part of the light illumination base member which is cut along a lengthwise direction in two parts. FIG. 7 is an enlarged perspective view showing a grating pattern. As shown in FIG. 1, the light illumination base member 1, which is made of an optical glass or an optical plastic, has a pair of concave grating patterns 2a and 2b. The grating pattern 2a is provided on, for example, a bottom face 1a of the light illumination base member 1. The other grating pattern 2b is provided on, for example, a top face 1b of the light illumination base member 1. As shown in FIG. 7, the grating patterns 2a and 2b are probably configured by substantially equal plural straight grooves 20 having a predetermined width. Such grooves 20 are formed by a photolithography-etching method, or the like. For example, when a light beam having a wave length of 1 μm is used as a reference beam, it is desirable that the frequency of the grating pattern is about 1 μm and the depth of the grooves are below 1 μm.

The grating patterns 2a and 2b are placed at a predetermined distance in the lengthwise direction of the light illumination base member 1. A light beam radiated from a light source 3 is inputted into the light illumination base member 1 through the grating pattern 2a. The inputted light beam is refracted by the grating pattern 2a and multiply reflected by the boundary faces between the light illumination base member 1 and the air. Thus, the light beam moves through in the light illumination base member 1. The light beam diverges in the light illumination base member 1 owing to the product of the divergence angle of the light beam and the predetermined distance between the grating patterns 2a and 2b. Finally, the light beam is outputted from the light illumination base member 1 from the grating pattern 2b.

When the light illumination base member 1 configured above is used, the light beam outputted from the grating pattern 2b is expanded. Thus, no optical member such as an optical lens is necessary.

Figure 2:
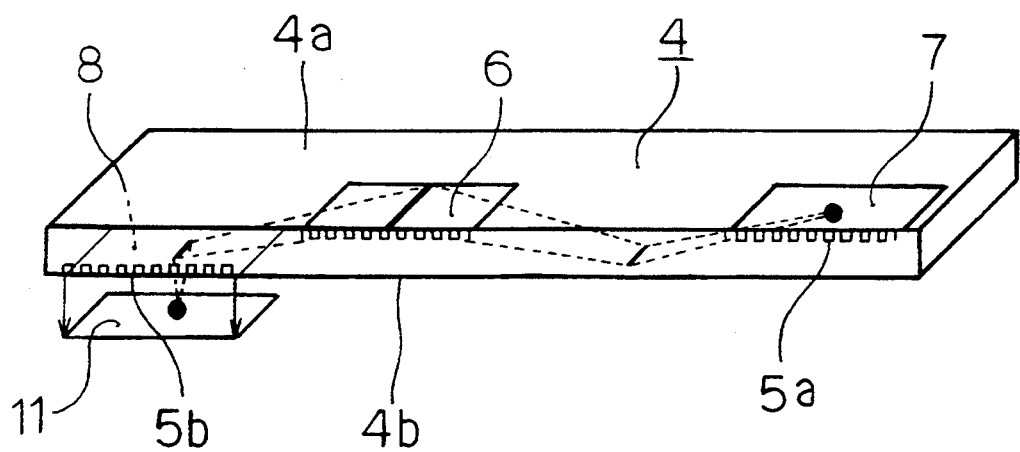
FIG. 2 is a perspective view showing a preferred embodiment of an image transmission base member in accordance with the invention.
Figure 8:
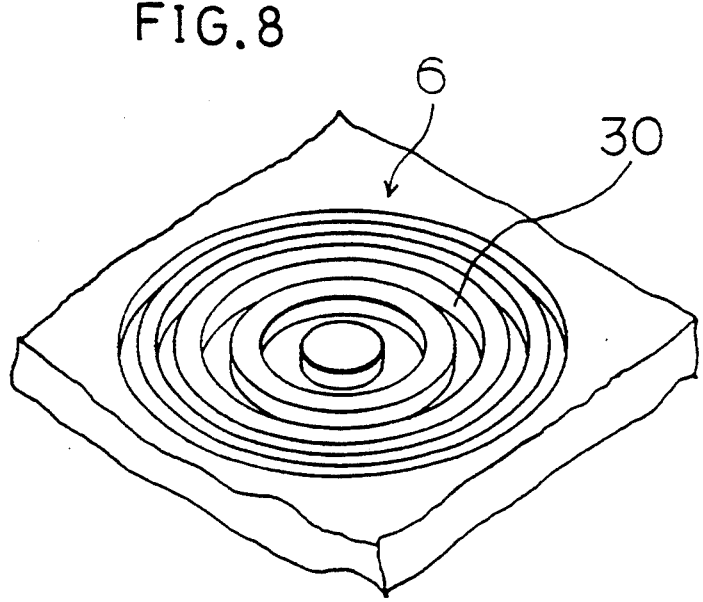
FIG. 8 is an enlarged perspective view showing a preferred embodiment of a diffraction lens pattern in accordance with the invention.

Next, a preferred embodiment of an image transmission base member in accordance with the invention is described referring to FIG. 2. FIG. 2 is a perspective view showing a part of the image transmission base member which is cut along the lengthwise direction in two parts. As shown in FIG. 2, the image transmission base member 4, which is made of an optical glass or an optical plastic, has a pair of grating patterns 5a and 5b. The grating pattern 5a is provided on, for example, a top face 4a of the image transmission base member 4. The other grating pattern 5b is provided on, for example, a bottom Face 4b of the image transmission base member 4. The grating pattern 5a serves as a picture Image inputting face 7, and the grating pattern 5b serves as a picture image outputting face 8. Furthermore, a diffraction lens pattern 6 is provided on the top face 4a of the image transmission base member 4 and it is placed between the grating patterns 5a and 5b. The diffraction lens pattern 6 serves as a focusing lens for focusing a light beam moving through in the image transmission base member 4. As shown in FIG. 8, the diffraction lens pattern 6 is configured by plural concave oval grooves 30. The oval grooves 30 are narrower toward outer side. Thus, the light beam moving through the image transmission base member 4 can be focused successfully. The diffraction lens pattern 6 is also formed by the photolithography-etching method.

When a light beam, which is radiated from a light source (which is not shown in FIG. 2, but is substantially the same as the light source 3 in FIG. 1), is inputted into the image transmission base member 4 through the grating pattern 5a, the inputted light beam is refracted by the grating pattern 5a and multiply reflected by the boundary faces between the image transmission base member 4 and the air. Thus, the light beam moves through in the image transmission base member 4. The light beam moving through the image transmission base member 4 is focused by the diffraction lens pattern 6. Finally, the light beam is outputted from the image transmission base member 4 from the grating pattern 5b, and focused on a focal plane 11.

In the embodiment of FIG. 2, the diffraction lens pattern 6 is positioned where the reflected light coming from the picture image inputting face 7 is twice reflected by the boundary face between the image transmission base member 4 and the air by selecting the incident angle component of the light coming in the picture image inputting face 7.

In order to control the incident angle component of the light coming in the picture image inputting face 7, the difference in refractive index between the boundary face of the image transmission base member 4 and the outside of the image transmission base member 4 should be adjusted. For example, an optical material having a refraction index smaller than that of the material of the image transmission base member 4 is coated on a part of the surface of the image transmission base member 4 facing the picture image inputting face 7. Thus, the component of the light having the larger incident angle can be radiated to the outside of the image transmission base member 4. The radiated light component can be removed by toughening the surface of the image transmission base member 4 facing the picture image inputting face 7 and providing a photoabsorptive material such as a plastic with black pigment on the toughened surface.

Hereupon, combinations of typical optical materials such as glass (refraction index: 1.51), methacrylic resin (refraction index: 1.49), polycarbonate (refraction index: 1.59) and air (refraction index: 1.00) are considered. The critical angles at which the incident light is totally reflected on the boundary of the materials are calculated. The critical angle to the perpendicular line on the boundary face is shown in the following table 1.

TABLE 1

| Combination of Optical Materials | Critical Angle |
| --- | --- |
| Glass and Air | 41.8 degree |
| Glass and Methacrylic Resin | 80.7 degree |
| Polycarbonate and Methacrylic Resin | 69.6 degree |

Furthermore, the critical angle of the incident light can be controlled by selecting the wavelength of the light beam using a laser, a light emitting diode, luminescent diode and the like, the frequency of the grating pattern and the order of the diffraction. Since the refraction index of the air $n_1 = 1.00$, the frequency of the grating pattern and the incident angle can be obtained by the following equations.

$$\Lambda = 2m\lambda_0 W / n_2 L (1 + L/2W)^{\frac{1}{2}}$$

$$\Theta_m = \sin^{-1}(m\lambda_0 / n_2 \Lambda)$$

When the refraction index $n_2$ of the image transmission base member 4 is 1.5 ($n_2 = 1.5$), the order of the diffraction $m = 1$, the wavelength $\lambda_o$ is 1.5 μm ($\lambda_o = 1.5$ μm), the thickness W of the image transmission base member 4 is 1.0 mm (W = 1.0 mm) and the transmission length L by one reflection is 20 mm (L = 20 mm), the frequency of the diffraction $\Lambda = 1$ μm and the incident angle $\Theta_1 = 83$ degree are obtained. This calculated data show that the light beam can be transmitted in the image transmission base member 4, that is the waveguide-type image reading can be attained. When the visible laser beam is used as a reference beam, the frequency of the grating pattern becomes on the order of submicron, but the waveguide-type image transmission can be attained by the recent semiconductor manufacturing technique.

Figure 3:
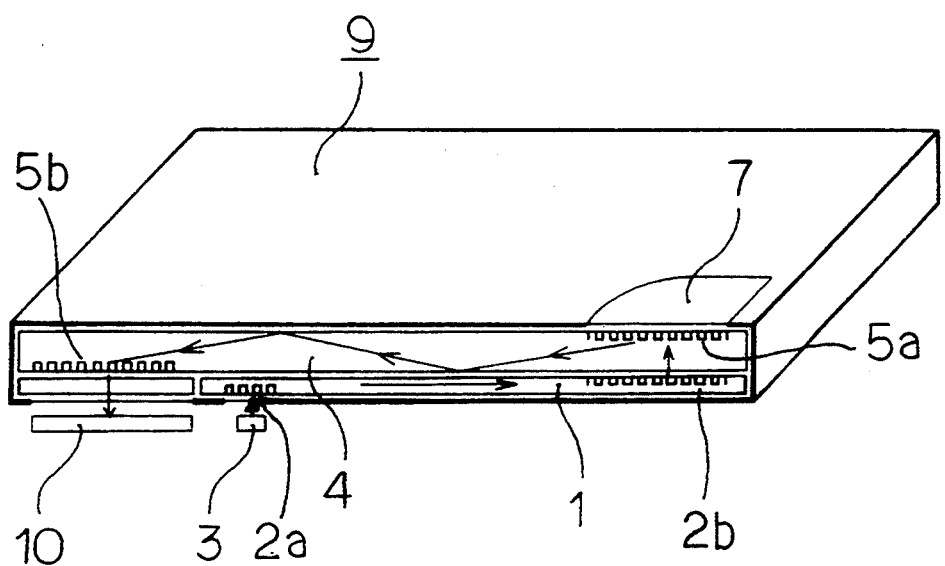
FIG. 3 is a perspective view showing a preferred embodiment of a waveguide-type image transmission device in accordance with the invention.

A preferred embodiment of the waveguide-type image transmission device in accordance with the invention is described referring to FIG. 3. FIG. 3 is a perspective view showing the waveguide-type image transmission device which is cut into halves. As shown in FIG. 3, the waveguide-type image transmission device 9 is configured by piling up the aforementioned light illumination base member 1 shown in FIG. 1 and the image transmission base member 4 shown in FIG. 2. The waveguide-type image transmission device 9 has a substantially card shape. The waveguide-type image transmission device 9 has a light source 3 and a photosensor 10 which are provided outside of the device 9.

When a light beam radiated from a light source 3 is inputted into the light illumination base member 1 through the grating pattern 2a, the inputted light beam is refracted by the grating pattern 2a and multiply reflected by the boundary faces between the light illumination base member 1 and the air. Thus, the light beam moves through the light illumination base member 1, and the light beam is outputted from the light illumination base member 1 via the grating pattern 2b. The light beam outputted from the grating pattern 2b comes into the image transmission base member 4 substantially perpendicular to the grating pattern 5a. When the light beam is outputted from the grating pattern 5a, the light beam illuminates the finger touching the picture image inputting face 7. The reflected light beam corresponding to the fingerprint pattern image comes in the image transmission base member 4 obliquely through the grating pattern 5a. The reflected light beam is multiply reflected by the boundary faces between the image transmission base member 4 and the air and focused by the diffraction lens pattern 6. Thus, the reflected light beam moves through the image transmission base member 4, and finally goes out from the picture image outputting face 8 (that is the grating pattern 5b) and is focused on the photosensor 10 on the focal plane 11.

Furthermore, the missing light beams owing to the scattering in the light illumination base member 1 or the image transmission base member 4 can be reduced by roughening the outside faces of the base members 1 and 4 and providing a photo-absorptive material such as plastic with black pigment and so on. Thus, the intrusion of the missing light into the photosensor 10 can be prevented. When the waveguide-type image transmission device 9 has such a configuration, the optical systems of illumination and focusing can be integrated in the card-shaped configuration.

Figure 4A:
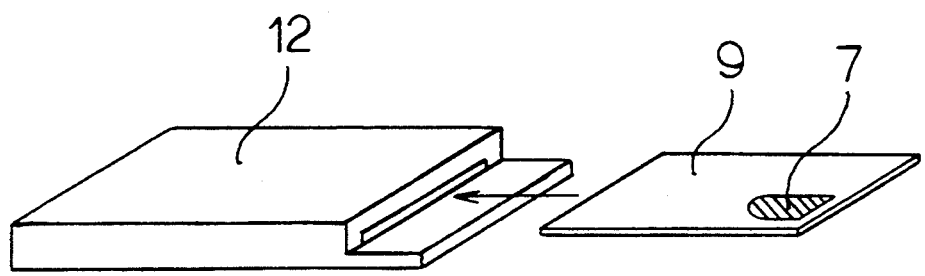
FIGS. 4(a) and 4(b) are perspective views showing a preferred embodiment of a fingerprint identification system in accordance with the invention.

A preferred embodiment of a fingerprint identification system, which uses the above-mentioned waveguide-type image transmission device, is described referring to FIG. 4(a). FIG. 4(a) shows a card reading system in which the waveguide-type image transmission device 9 and an identification card (hereinafter abbreviated as ID card) are combined. In FIG. 4(a), numeral 12 designates a card reading apparatus, which includes an ID data reader, a light source, a photosensor, a control circuit for controlling these members, and a memory for storing the personal fingerprint data and so on. In such a system, the waveguide-type image transmission device 9 which includes the ID data is put in the card reading apparatus 12, and the finger of the user is put on the picture image inputting face 7 of the waveguide-type image transmission device 9. The fingerprint image data and the ID data can be read by the card reading apparatus 12 at the same time.

Figure 4B:
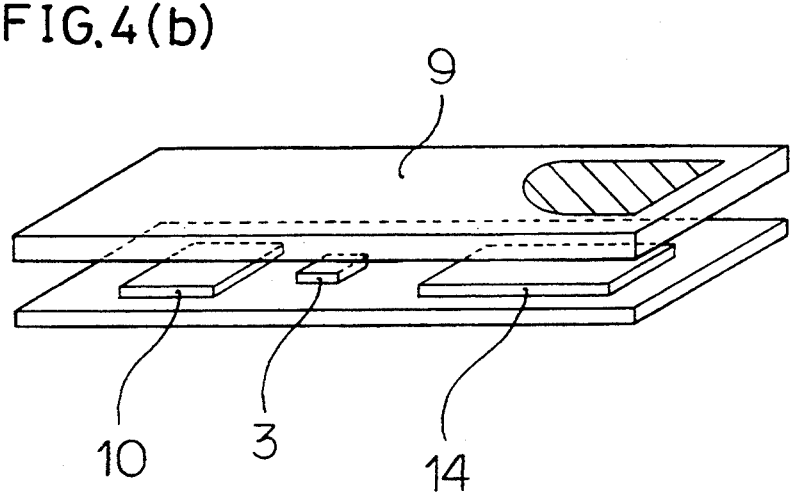

FIG. 4(b) is a perspective view showing a fingerprint identification module in which the light source 3, the photosensor 10 and the control circuit 14 are integrated into the waveguide-type image transmission device 9. The module can be loaded on a terminal, portable equipment, and the like for identifying the personal fingerprint.

Figure 5:
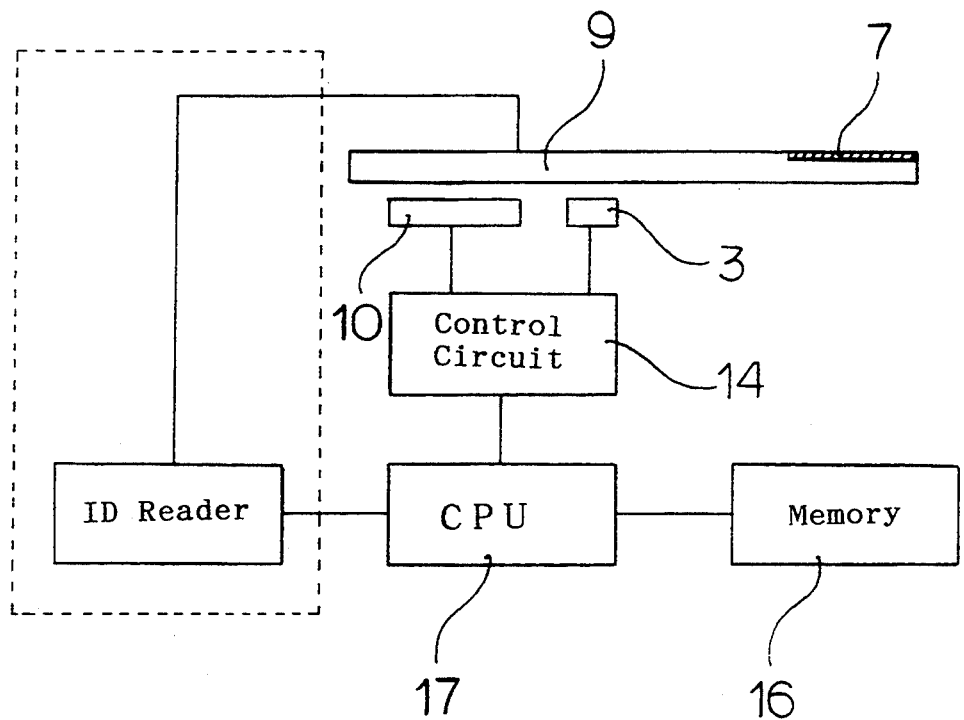
FIG. 5 is a block diagram showing a system for identifying a fingerprint.
Figure 6:
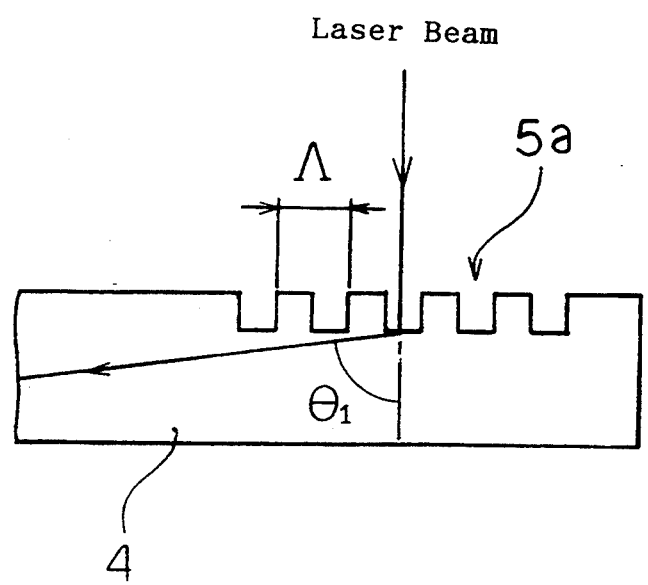
FIG. 6 is a partially enlarged sectional view showing an incidence of a light beam to the image transmission base member in accordance with the invention.

A preferred embodiment of a fingerprint identification system in accordance with the invention is described referring to FIG. 5. As shown in FIG. 5, the light source 3 such as a laser, a light emitting diode, a luminescent diode and the like, the photosensor 10 such as a CCD, the control circuit 14 for controlling the light source and the CCD, the memory 16 for storing the personal fingerprint image data and a CPU 17 for comparing the fingerprint image data from the waveguide-type image transmission device 9 and the fingerprint image data stored in the memory 16 are provided in the reading part of the waveguide-type image transmission device 9.

When the waveguide-type image transmission device 9 is set at a predetermined position in the fingerprint identification system, and the finger of the user is put on the picture image inputting face 7, the fingerprint is read as a fingerprint image data into the system and image processing is executed. The processed fingerprint image data is compared with the personal finger image data previously stored in the memory 16 by the CPU 17. Thus, the personal identification is completed.

The above-mentioned fingerprint identification system is attained without using any independent optical members such as a lens and so on. Thus, even when many persons use the same fingerprint identification system, there is no trouble due to dirt or damage of the optical system. As a result, the fingerprint identification system can be maintained substantially the same as that of a conventional card identification system.

Furthermore, when the waveguide-type image transmission device 9 is integrated with the ID card, the ID data is used for reading out a specific fingerprint image data among many personal fingerprint image data stored in the memory. Thus, a higher level security system can be attained.

In addition, when the waveguide-type image transmission device 9 is integrated with the ID card, many personal fingerprint image data can be stored in an IC memory. In this case, the personal identification can be executed by using the ID card only without storing the personal finger imaged data in each terminal. Furthermore, when the waveguide-type image transmission device 9 is used together with an optical card or ROM card, the fingerprint identification can be executed by using the card only, since the optical card or ROM card has a large memory capacity like the IC card, and they can store a great deal of personal fingerprint image data.

In the above-mentioned embodiments, the light illumination base member 1 and the image transmission base member 4 are made of optical glass, but the material is not restricted to glass, and they can be made by transparent materials such as PMMA, polycarbonate and so on. Furthermore, in the above-mentioned embodiments, the grating patterns 5a and 5b are respectively provided on the different faces of the image transmission base member 4, but the configuration of the image transmission base member 4 is not restricted to the embodiments. When the grating patterns 5a and 5b are provided on the same face and the diffraction lens pattern 6 is also provided on the same face, substantially the same operation and effects can be obtained. In this case, since the grating patterns 5a and 5b and the diffraction lens pattern 6 are formed on the same face, the mass production of the waveguide-type image transmission device 9 can be made. In addition, when two diffraction lens pattern is used, the image data can be transmitted by a parallel beam.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A waveguide-type image transmission device comprising:
    a light illumination means having: a light illumination base member made of a light transparent material and transmitting a light beam by multiple reflection on said boundary faces thereof; a first grating pattern formed on a part of a surface of said light illumination base member and diffracting an inputted light beam in a predetermined direction; a second grating pattern provided on another part of the surface of said light illumination base member and diffracting and outputting the light beam transmitted in said light illumination base member in another predetermined direction for illuminating an object to be identified; and
    an image transmission means having: an image transmission base member made of a transparent material and transmitting a light beam by multiple reflection on the boundary faces thereof; a third grating pattern formed on a part of a surface of said image transmission base member and diffracting an input light beam which is reflected by said object in a predetermined direction; a diffraction lens pattern formed on another part of the surface of said image transmission base member for focusing the light beam which is transmitted in said image transmission base member; and a fourth grating pattern formed on still another part of the surface of said image transmission base member and diffracting and outputting the light beam which is transmitted in said image transmission base member and focused by said diffraction lens pattern in still another predetermined direction.

2. The waveguide-type image transmission device in accordance with claim 1, wherein
    said first and second grating patterns are respectively provided at a predetermined interval and on different surfaces of said light illumination base member which are facing each other, and an exit area of said light beam is expanded corresponding to the product of a divergent angle of the light beam and said predetermined interval.

3. The waveguide-type image transmission device in accordance with claim 1, wherein
    said first and said second grating patterns are provided on the same surface of said light illumination base member at a predetermined interval.

4. The waveguide-type image transmission device in accordance with claim 1, 2 or 3, wherein
    said third and fourth grating patterns are respectively provided on different surfaces of said image transmission base member which are facing each other, and a part of said light beam reflected by said object and having a predetermined incident angle is inputted to said image transmission base member from said third grating pattern.

5. The waveguide-type image transmission device in accordance with claim 1, 2 or 3, wherein
    said third and fourth grating patterns and said diffraction lens pattern are provided on the same surface of said image transmission base member at predetermined intervals.

6. The waveguide-type image transmission device in accordance with claim 1, 2 or 3, wherein
    said object is a personal fingerprint or a palmprint.

7. The waveguide-type image transmission device in accordance with claim 1, 2 or 3, wherein
    said image transmission base member is piled up on said light illumination base member, thereby forming a card shape.

8. The waveguide-type image transmission device in accordance with claim 1, 2 or 3, wherein
    said waveguide-type image transmission device is integrated with an ID card, an IC card, an optical card or a ROM card.

9. The waveguide-type image transmission device in accordance with claim 1, 2 or 3 further comprising:
    a memory for storing registered image data of personal fingerprints and said stored personal fingerprint data is read out from said memory at the same time as inputting a fingerprint image.

10. A fingerprint identification device comprising:
    a card-shaped waveguide-type image transmission device having a light illumination means and an image transmission means; and
    a board on which a light emitting element, a light detecting element, and a control circuit for controlling said light emitting element and said light detecting element are mounted.

11. The fingerprint identification device in accordance with claim 10, wherein said card-shaped waveguide-type image transmission device comprises:
    a light illumination means having: a light illumination base member made of a transparent material and transmitting a light beam by multiple reflection on the boundary faces thereof; a first grating pattern formed on a part of a surface of said light illumination base member and diffracting an inputted light beam in a predetermined direction; a second grating pattern provided on another part of the surface of said light illumination base member and diffracting and outputting the light beam transmitted in said light illumination base member in another predetermined direction for illuminating an object to be identified; and
    an image transmission means having: an image transmission base member made of a transparent material and transmitting a light beam by multiple reflection on the boundary faces thereof; a third grating pattern formed on a part of a surface of said image transmission base member and diffracting an input light beam which is reflected by said object in a predetermined direction; a diffraction lens pattern formed on another part of the surface of said image transmission base member for focusing said light beam which is transmitted in said image transmission base member; and a fourth grating pattern formed on still another part of the surface of said image transmission base member and diffracting and outputting the light beam which is transmitted in said image transmission base member and focused by said diffraction lens pattern in still another predetermined direction.

12. The fingerprint identification device in accordance with claim 11, wherein
said first and second grating patterns are respectively provided at a predetermined interval and on different surfaces of said light illumination base member which are facing each other, and an exit area of said light beam is expanded corresponding to the product of a divergent angle of said light beam and said predetermined interval.

13. The fingerprint identification device in accordance with claim 11, wherein
said first and second grating patterns are provided on the same surface of said light illumination base member at a predetermined interval.

14. The fingerprint identification device in accordance with claim 11, 12 or 13 wherein
said third and fourth grating patterns are respectively provided on different surfaces of said image transmission base member which are facing each other, and a part of said light beam reflected by said object and having a predetermined incident angle is inputted to said image transmission base member from said third grating pattern.

15. The fingerprint identification device in accordance with claim 11, 12 or 13, wherein
said third and fourth grating patterns and said diffraction lens pattern are provided on the same surface of said image transmission base member at predetermined intervals.

16. The fingerprint identification device in accordance with any one of claims 10 to 13, wherein
said waveguide-type image transmission device is integrated with one selected among an ID card, an IC card, an optical card and a ROM card.

17. The fingerprint identification device in accordance with any one of claims 10 to 13, wherein
said waveguide-type image transmission device further comprises a memory for storing registered image data of personal fingerprints and said stored personal fingerprint data is read out from said memory at the same time as inputting a fingerprint image.

* * * * *